United States Patent Office 3,285,926
Patented Nov. 15, 1966

3,285,926
(PERFLUORODIOXOCYCLOALKYL)PYRIDINIUM BETAINES
Samuel E. Ellzey, Jr., and Wilma A. Guice, New Orleans, La., assignors to the United States of America as represented by the Secretary of Agriculture
No Drawing. Filed Sept. 29, 1964, Ser. No. 400,279
21 Claims. (Cl. 260—295)

A non-exclusive, irrevocable, royalty-free license in the invention herein described, throughout the world for all purposes of the United States Government, with the power to grant sublicenses for such purposes, is hereby granted to the Government of the United States of America.

The present invention relates to (perfluorodioxocycloalkyl)pyridinium betaines useful for heat transfer media in the fused state and for imparting resistance to microbiological degradation when deposited on cellulosic material.

More specifically, the invention relates to the preparation of these novel compounds.

As used herein, the term (perfluorodioxocycloalkyl) pyridinium betaines includes cyclic fluorinated compounds in which there is present a pyridinium or substituted pyridinium radical bound to a cycloalkyl moiety substituted with fluorine atoms. The general formula for this class of compounds is:

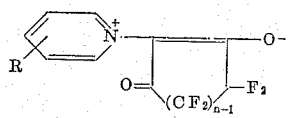

in which R may be COOR′, Br, or H; R′ is alkyl and $n$ is an integer from 1 to 3.

When $n$ is 1, $n-1$ is zero and the ring has four members. When $n$ is 2, $n-1$ is 1 and the ring has five members. When $n$ is 3, $n-1$ is 2 and the ring has six members.

Pruett, Bahner and Smith (J. Am. Chem. Soc. 74, 1638 (1952)) admixed hexafluorocyclobutene with pyridine or a pyridine derivative without any additional solvent at room temperature. The time of contact between the hexafluorocyclobutene and the pyridine varied from several hours to several weeks. 2-chloropyridine or 2,2′-dipyridyl did not react with the hexafluorocyclobutene. Pyridine or 2-methylpyridine caused the olefin to polymerize. When 3-bromopyridine was admixed with the hexafluorocyclobutene without addition of a solvent, a reaction did occur, producing a trimer of the olefin and a betaine in very low yield. This latter product was identified as (3,3-difluoro-2,4-dioxocyclobutyl)-3-bromopyridinium betaine, a product having a four-membered ring (i.e., $n=1$).

In the case of ethyl nicotinate or isonicotinate there was formed, in addition to olefin polymers, a product resulting from the substitution of a pyridinium group for one fluorine atom of the olefin dimer. In all cases a considerable amount of intractable tar was formed.

We have now found that cyclic fluorinated olefins may be reacted with pyridine or substituted pyridines in certain solvents to form the corresponding pyridinium betaines without the formation of tars, trimers, dimers, or pyridine-olefin dimer adducts. As will be noted in the examples below, the yield in many reactions is practically quantitative.

Broadly, the process of our invention involves the reaction of at least one molar proportion of a halogenated cyclic fluorinated olefin of the general formula

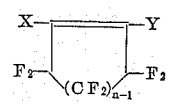

wherein $n$ is an integer from 1 to 3, and X and Y are either F or Cl, with at least one molar proportion of pyridine or a substituted pyridine wherein the substituent R on the pyridine ring has the same meaning as noted above.

More specifically the reaction of a cyclic fluorinated olefin of the above structure with pyridine or a substituted pyridine is carried out in a suitable solvent such as N,N-dimethylformamide (referred to below as DMF) or a lower alkanoic acid, particularly glacial acetic acid, in the presence of water, preferably at least 2.0 moles of water per mole of olefin. N,N-dimethylformamide is not suitable as the solvent when $n=1$, as see Example 1, hereinafter. As noted above, when no solvent is used the desired betaine is not generally produced but much tar forms along with olefin polymers.

It is this specificity of our process for preparing the betaines that clearly differentiates our process from that practiced by Pruett et al.

The reaction between the olefin and pyridine or substituted pyridine in the solvent in the presence of water is continued until no unchanged olefin remains and the resulting betaine is then precipitated by diluting the reaction solution with an excess of water. Thereafter, the precipitated betaine is washed to remove the solvent, and then recovered and dried.

The preferred solvent for the process of this invention is glacial acetic acid. This was unexpected. Just why the use of solvents such as N,N-dimethylformamide or the lower alkanoic acids such as glacial acetic acid promotes the conversion of cyclic fluorinated olefins with pyridine or substituted pyridines is not completely understood. Without so limiting our invention one possible explanation is that where a nonacidic solvent such as DMF is used the solution is sufficiently basic to allow the formation of much tar in reactions involving the more highly reactive olefins, i.e., those containing four carbon atoms in the ring.

The olefins containing five or six carbon atoms in the ring are less reactive and N,N-dimethylformamide is a suitable solvent (Examples 2 and 3). On the other hand the lower alkanoic acids such as glacial acetic or similar weak acids lower the basicity of the medium sufficiently to prevent this tar formation but yet allow the weakly basic pyridine or substituted pyridine to react with the olefin. As a corollary of this possible explanation acids of much higher acid strength might successfully compete with the olefin for the unshared pair of electrons on the pyridine nitrogen thereby preventing the formation of the betaine. To confirm this projected explanation pyridine was treated with 1,2-dichloroperfluorocyclopentene using the strongly acidic trifluoroacetic acid as a solvent. More than 50% of the starting olefin was recovered unchanged but no betaine was obtained. Under similar conditions in acetic acid no unchanged olefin remained and the betaine was isolated in nearly quantitative yield as the sole product.

Reaction times suitable for the practice of the process of this invention may vary from several minutes to several days, depending upon the reactivity of the olefin and the pyridine derivative used. Reaction temperatures may vary from about 10° to about 120° C. or higher. For reactions between the more reactive fluorinated cyclobutenes and pyridine a reaction time of one hour at room temperature is sufficient, while for the less reactive cyclohexene derivatives a period of about 12 hours at reflux temperature is required to give reasonable yields of the desired betaine.

When a second phase was no longer perceptible upon dilution of a few drops of the reaction mixture with water, the formation of the betaine was judged to be complete.

It is an advantage of our invention to use a large excess of pyridine in the process. This excess of pyridine serves as a scavenger for the hydrogen chloride and hydrogen fluoride which are formed during the reaction.

Water need not be present in the reaction mixture since the product formed in anhydrous acetic acid was easily hydrolyzed subsequently to the betaine in moist air or by pouring the reaction mixture into water. We prefer to employ water during the reaction to avoid a separate hydrolysis step, as will be described in the examples.

The betaines prepared by the process of the present invention are rather inert chemically. They possess high thermal stability and may be used as heat transfer media in the fused state. Deposition of the betaines onto cellulosic material confers a certain amount of resistance to microbiological degradation. The tensile strength of scoured cotton printcloth treated with the betaines is more than double that of an untreated control sample after both fabrics have been subjected to soil burial for a week.

The following examples are given by way of illustration only and are not to be construed as limiting the scope of this invention. Temperatures are in Centigrade degrees. Molecular weights were determined osmometrically.

*Example 1*

In the following example a highly reactive olefin containing four carbon atoms in the ring is used with N,N-dimethylformamide as the solvent.

A mixture of 4.87 g. (0.025 mole) of 1,2-dichloroperfluorocyclobutene, 25 ml. of N,N-dimethylformamide (DMF), and 10 ml. of water was stirred as 19.9 g. (0.25 mole) of pyridine was added dropwise. The temperature rose to about 60° and then began to fall. The mixture was diluted with 100 ml. of water, cooled, and filtered. The weight of tarry product was 2.42 g. Purification was extremely difficult due to the presence of the tar.

It will be observed that DMF is not a suitable solvent for olefins containing four carbons in the ring.

*Example 2*

In the following example, a less reactive olefin containing five carbon atoms in the ring is used with DMF as the solvent.

A mixture of 6.12 g. (0.025 mole) of 1,2-dichloroperfluorocyclopentene, 25 ml. of N,N-dimethylformamide, and 10 ml. of water was stirred and treated with 19.9 g. (0.25 mole) of pyridine. After refluxing for one hour, 100 ml. of water was added, and the mixture was cooled well. The filtered solid was washed well with water and dried. The betaine weighed 5.13 g. (83%), M.P. 229–230°.

It will be observed that with an olefin containing five carbon atoms in the ring, DMF is a useful solvent.

*Example 3*

In the following example, an olefin containing six carbon atoms in the ring is used with DMF as the solvent.

To a mixture of 7.37 g. (0.025 mole) of the 1,2-dichloroperfluorocyclohexene, 50 ml. of N,N-dimethylformamide, and 10 ml. of water was added 19.9 g. of pyridine (0.25 mole). After refluxing one hour the mixture was poured into 100 ml. of water, cooled, and filtered. The washed solid weighed 3.10 g. (42%), M.P. 191–193°.

It will be observed that no tar was present.

In the following examples, lower alkanoic acids represented by glacial acetic acid are used as the solvents.

*Example 4*

A mixture of 19.78 g. (0.25 mole) of pyridine, 25 ml. of glacial acetic acid, and 1 ml. of water was cooled to 25°. To this was added with stirring 4.87 g. (0.025 mole) of 1,2-dichloroperfluorocyclobutene. Within 20 min. the temperature rose to 56° and slowly began to fall. After a total reaction time of one hour, 100 ml. of water was added, the mixture was cooled, and the orange solid was filtered, washed with water, and dried. A second crop was obtained from the filtrate on standing. The yield of (3,3 - difluoro - 2,4 - dioxocyclobutyl)pyridinium betaine, M.P. 241–243°, was 4.77 g. (97%). Recrystallization from aqueous acetone (Norit) gave colorless needles, M.P. 241–242°.

*Analysis.*—Calcd. for $C_9H_5F_2NO_2$: C, 54.83; H, 2.56; F, 19.28; N, 7.11; mol. wt., 197. Found: C, 55.01; H, 2.65; F, 19.13; N, 6.96; mol. wt., 199 (in acetone).

It will be observed that when a lower alkanoic acid, represented by glacial acetic acid, is used as the solvent, a 97% yield of a betaine having a ring ($n=1$) containing four carbon atoms was obtained. No tar was observed.

*Example 5*

Into a solution of 19.78 g. of pyridine (0.25 mole) 25 ml. of glacial acetic acid, and 1 ml. of water cooled to 15° was slowly bubbled gaseous hexafluorocyclobutene until 4.05 g. (0.025 mole) was absorbed. During the addition period of 2.5 hrs. the temperature rose to 35° as an orange solid precipitated. After pouring into 100 ml. of water and cooling well, the solid was filtered and washed with water. The product weighed 4.94 g. (quantitative yield), M.P. 242–244°. Recrystallization from aqueous acetone did not appreciably change the melting point of the betaine.

*Example 6*

A mixture of 6.12 g. (0.025 mole) of 1,2-dichlorohexafluorocyclopentene, 19.78 g. (0.25 mole) of pyridine, 25 ml. of glacial acetic acid, and 1 ml. of water was refluxed one hour. After the addition of 100 ml. of water the mixture was cooled and filtered. The weight of (3,3,4,4-tetrafluoro-2,5-dioxocyclopentyl)pyridinium betaine was 5.98 g. (97%), M.P. 229–231°. Recrystallization from aqueous acetone (Norit) did not raise the melting point.

*Analysis.*—Calcd. for $C_{10}H_5F_4NO_2$: C, 48.59; H, 2.04; F, 30.75; N, 5.67; mol. wt., 247. Found: C, 48.80; H, 2.27; F, 31.00; N, 5.83; mol. wt., 252 (in acetone).

*Example 7*

A mixture of 7.37 g. (0.025 mole) of 1,2-dichlorooctafluorocyclohexene, 19.78 g. (0.25 mole) of pyridine, 25 ml. of glacial acetic acid, and 1 ml. of water was refluxed for 12 hrs. After addition of 100 ml. of water the mixture was cooled, filtered, and washed with water. The grey platelets of (3,3,4,4,5,5-hexafluoro-2,6-dioxocyclohexyl)pyridinium betaine weighed 4.76 g. (64%), M.P. 191–192°. Recrystallization from water (Norit) gave colorless needles, M.P. 191–192°.

*Analysis.*—Calcd. for $C_{11}H_5F_6NO_2$: C, 44.46; H, 1.70; F, 38.36; N, 4.71; mol. wt., 297. Found: C, 44.69; H, 1.93; F, 38.18; N, 4.57; mol. wt., 300 (in acetone).

Example 8

A mixture of 39.5 g. (0.27 mole) of 3-bromopyridine, 6.12 g. (0.025 mole) of 1,2-dichlorohexafluorocyclopentene, 25 ml. of glacial acetic acid, and 1 ml. of water was stirred for 24 hrs. at room temperature, acidified with dilute hydrochloric acid, cooled, and filtered. The precipitate of (3,3,4,4 - tetrafluoro - 2,5 - dioxocyclopentyl)-3-bromopyridinium betaine, M.P. 184–186°, weighed 2.73 g. (33%) after washing and drying. Recrystallization from aqueous acetone gave colorless crystals, M.P. 184–185°.

*Analysis.*—Calcd. for $C_{10}H_4BrF_4NO_2$: C, 36.83; H, 1.24; F, 23.31; N, 4.30; mol. wt., 326. Found: C, 37.05; H, 1.37; F, 23.30; N, 4.31; mol. wt., 320 (in acetone).

Example 9

A mixture of 6.12 g. (0.025 mole) of 1,2-dichlorohexafluorocyclopentene, 37.8 g. (0.25 mole) of ethyl isonicotinate, 25 ml. of glacial acetic acid, and 1 ml. of water was refluxed 24 hrs., cooled, and water was added. The filtered precipitate was washed with water and dried, 11.56 g., M.P. 157–252°. A second crop from the filtrate, M.P. 163–262°, weighed 0.40 g. The combined solid was heated with 150 ml. of hot water whereupon 2.88 g. (36%) of crude (3,3,4,4-tetrafluoro-2,5-dioxocyclopentyl)-4-carbethoxy-pyridinium betaine, M.P. 220–258°, was filtered from the mixture. Two recrystallizations from aqueous acetone gave the pure product, M.P. 235–236°.

*Analysis.*—Calcd. for $C_{13}H_9F_4NO_4$: C, 48.91; H, 2.84; F, 23.81; N, 4.39; mol. wt., 319. Found: C, 49.03; H, 2.74; F, 23.73; N, 4.59; mol. wt., 315 (in acetone).

The filtrate after separation of the betaine was cooled and yielded 3.70 g. of a solid, M.P. 215–231°. Recrystallization from aqueous acetone gave a solid, M.P. 271–273°, which is thought to be a mixture of the above betaine and isonicotinic acid. The filtrate after removal of the 3.70 g. of solid above was evaporated to dryness and gave 0.77 g. of crude isonicotinic acid, M.P. 316–317° (sealed tube). Recrystallization from hot water gave the pure acid, M.P. 315–316° (sealed tube), identified by mixture melting point and infrared spectra.

Example 10

A mixture of 1.46 g. (0.0075 mole) of 1,2-dichlorotetrafluorocyclobutene, 10.13 g. (0.067 mole) of ethyl isonicotinate, 10 ml. of glacial acetic acid, and 1 ml. of water was stirred at room temperature for 6 hrs. After addition of 60 ml. of water, the mixture was cooled and the solid was filtered. The weight of (3,3-difluoro-2,4-dioxocyclobutyl) - 4 - carbethoxypyridinium betaine, M.P. 235–237°, was 1.69 g. (84%). Recrystallization from aqueous acetone gave the pure solid, M.P. 236°.

*Analysis.*—Calcd. for $C_{12}H_9F_2NO_4$: C, 53.54; H, 3.37; F, 14.12; N, 5.20; mol. wt., 269. Found: C, 53.52; H, 3.47; F, 14.29; N, 5.19; mol. wt., 269 (in acetone).

Example 11

A piece of scoured and bleached cotton printcloth (68 x 72) was padded with a 10 weight percent solution of (3,3,4,4-tetrafluoro-2,5 - dioxocyclopentyl)pyridinium betaine in DMF, to give 100% pickup. The treated fabric was dried at 100° and placed in a soil burial bed with a similar piece of untreated cotton as a control. After four days, the control had disintegrated whereas the treated fabric retained considerable strength after eight days.

We claim:
1. A process for preparing (perfluorodioxocycloalkyl) pyridinium betaines of the formula

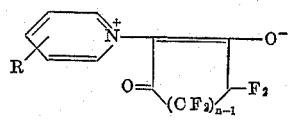

wherein R is selected from the group consisting of COOR', Br, and H; R' is alkyl and $n$ is an integer from 1 to 3, which process comprises the following steps:
(a) reacting at least one molar proportion of a halogenated cyclic fluorinated olefin of the type

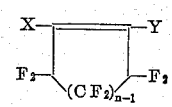

wherein X and Y are halogens selected from the group consisting of Cl and F and $n$ is an integer from 1 to 3, with at least one molar proportion of a pyridine compound selected from the group consisting of pyridine and substituted pyridine, in the presence of a solvent selected from the group consisting of a lower alkanoic acid and N,N-dimethylformamide; said N,N-dimethylformamide not being employed as the solvent when $n=1$;
(b) continuing the reaction until no unchanged olefin remains;
(c) precipitating the resulting betaine by diluting the reaction solution with an excess of water;
(d) washing the precipitated betaine to remove the solvent;
(e) recovering the precipitated betaine, and
(f) drying the recovered product.

2. The process according to claim 1 wherein the solvent contains at least 2.0 moles of water per mole of olefin.

3. The process according to claim 1 wherein the solvent is a lower alkanoic acid.

4. The process according to claim 3 wherein the lower alkanoic acid is glacial acetic acid.

5. The process according to claim 1 wherein the reaction temperature is from about 10° to about 120° C.

6. The process of claim 1, wherein R=H, $n=1$, X=Y=Cl, and the solvent is glacial acetic acid.

7. The process of claim 1 wherein R=H, $n=1$, X=Y=F, and the solvent is glacial acetic acid.

8. The process of claim 1 wherein R=H, $n=2$, X=Y=Cl, and the solvent is N,N-dimethylformamide.

9. The process of claim 1 wherein R=H, $n=2$, X=Y=Cl, and the solvent is glacial acetic acid.

10. The process of claim 1 wherein R=H, $n=3$, X=Y=Cl, and the solvent is N,N-dimethylformamide.

11. The process of claim 1 wherein R=H, $n=3$, X=Y=Cl, and the solvent is glacial acetic acid.

12. The process of claim 1 wherein R=3-bromo, $n=2$, X=Y=Cl, and the solvent is acetic acid.

13. The process of claim 1 wherein R=4-carbethoxy, $n=1$, X=Y=Cl, and the solvent is glacial acetic acid.

14. The process of claim 1 wherein R=4-carbethoxy, $n=2$, X=Y=Cl, and the solvent is glacial acetic acid.

15. (3,3-difluoro-2,4 - dioxocyclobutyl)pyridinium betaine.

16. (3,3,4,4 - tetrafluoro - 2,5 - dioxocyclopentyl)pyridinium betaine.

17. (3,3,4,4,5,5-hexafluoro - 2,6 - dioxocyclohexyl)pyridinium betaine.

18. (3,3-difluoro-2,4-dioxocyclobutyl) - 4 - carbethoxypyridinium betaine.

19. (3,3,4,4-tetrafluoro - 2,5-dioxocyclopentyl) - 4-carbethoxypyridinium betaine.

20. (3,3,4,4 - tetrafluoro - 2,5 - dioxocyclopentyl) - 3-bromopyridinium betaine.
21. A compound of the formula
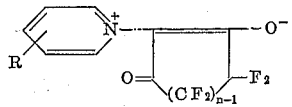
wherein R is selected from the group consisting of COOR′, Br, and H; R′ is alkyl and $n$ is an integer from 1 to 3.
References Cited by the Examiner
Pruett et al.: J. Am. Chem. Soc., vol. 74, pp. 1638–42 (1952).
JOHN D. RANDOLPH, *Primary Examiner.*
WALTER A. MODANCE, *Examiner.*
A. L. ROTMAN, *Assistant Examiner.*